United States Patent
Borri et al.

(10) Patent No.: US 9,768,994 B2
(45) Date of Patent: Sep. 19, 2017

(54) GENERATION AND PROCESSING OF A VARIABLE-BAND MODULATED OFDM SIGNAL WITH AUXILIARY SIGNALLING

(71) Applicants: CSP—INNOVAZIONE NELLE ICT SCARL, Turin (TO) (IT); SISVEL TECHNOLOGY S.R.L., None (TO) (IT)

(72) Inventors: Roberto Borri, Nole (IT); Floriana Crespi, Turin (IT); Alberto Perotti, Turin (IT)

(73) Assignee: S.I.SV.EL. SOCIETA' ITALIANA PER LO SVILUPPO DELL'ELETTRONICA S.P.A., None (TO) (IT)

( * ) Notice: Subject to any disclaimer, the term of this patent is extended or adjusted under 35 U.S.C. 154(b) by 0 days.

(21) Appl. No.: 14/350,552

(22) PCT Filed: Oct. 10, 2012

(86) PCT No.: PCT/IB2012/055475
§ 371 (c)(1),
(2) Date: Apr. 8, 2014

(87) PCT Pub. No.: WO2013/054266
PCT Pub. Date: Apr. 18, 2013

(65) Prior Publication Data
US 2014/0294105 A1    Oct. 2, 2014

(30) Foreign Application Priority Data
Oct. 11, 2011  (IT) .............................. TO2011A0906

(51) Int. Cl.
*H04L 27/06*  (2006.01)
*H04L 27/26*  (2006.01)
(Continued)

(52) U.S. Cl.
CPC ........ *H04L 27/2601* (2013.01); *H04L 5/0092* (2013.01); *H04L 5/04* (2013.01);
(Continued)

(58) Field of Classification Search
CPC ....................................................... H04L 27/26
(Continued)

(56) References Cited

U.S. PATENT DOCUMENTS 6,359,999 B1 * 3/2002 Moriwaki et al. ............ 382/100
2004/0001429 A1    1/2004 Ma et al.
(Continued)

FOREIGN PATENT DOCUMENTS

CN    101189802 A    5/2008
CN    101502034 A    8/2009
(Continued)

OTHER PUBLICATIONS

International Preliminary Report on Patentability dated Apr. 15, 2014, issued in PCT Application No. PCT/IB2012/055475, filed Oct. 10, 2012.
(Continued)

*Primary Examiner* — Jaison Joseph
(74) *Attorney, Agent, or Firm* — Workman Nydegger

(57) ABSTRACT

A method for generating a variable-band modulated signal (x) where the modulating digital signal (X) of the modulated signal (x) includes at least one component (C, S, P); the digital information (r) about the variable band is repeatedly or periodically superimposed on the at least one component (C, S, P) or on the modulating signal (X). While processing the received modulated signal (x"), the modulated digital signal (X") is extracted, the superimposed digital information (r) is obtained, and the extracted digital information (r)

(Continued)

Figure 1:
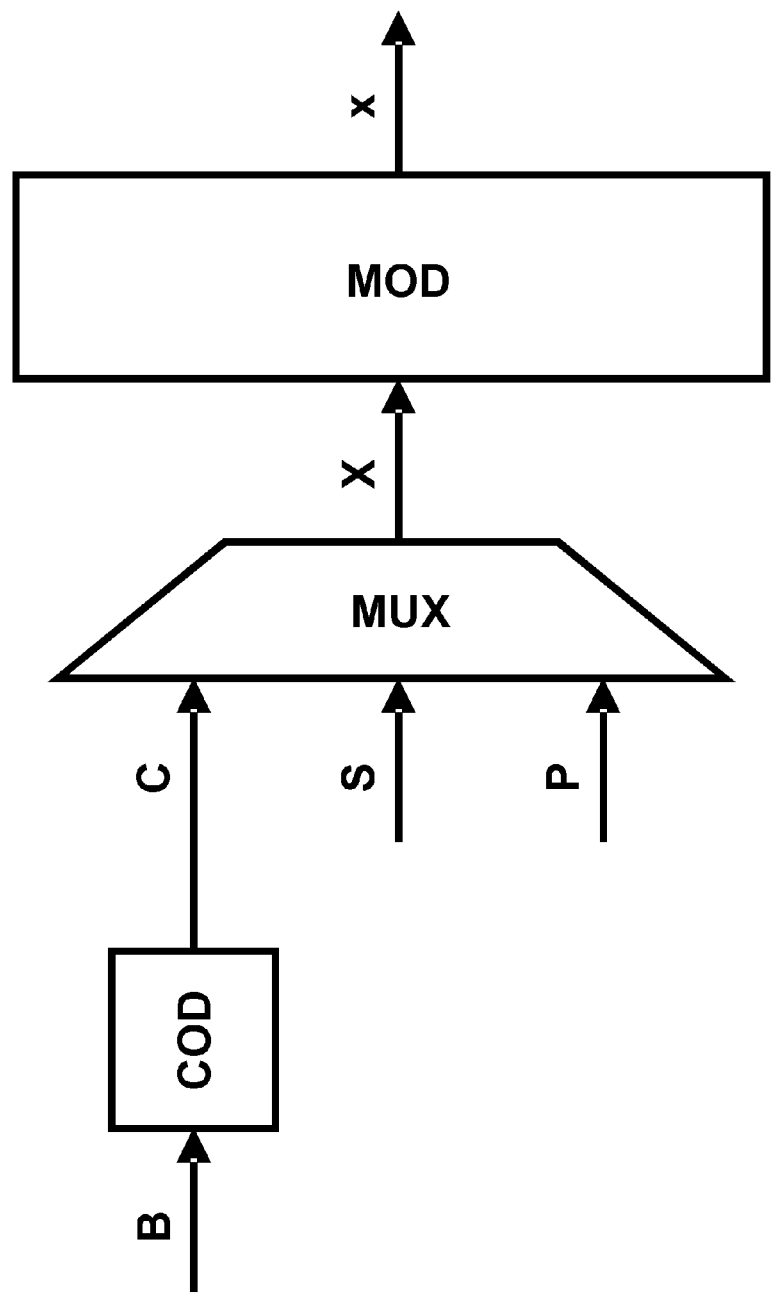

is used to determine the band of the modulated signal (x″) and to complete the demodulation and decoding of the modulated signal (x″).

22 Claims, 4 Drawing Sheets

(51) Int. Cl.
  *H04L 5/04*    (2006.01)
  *H04L 25/49*   (2006.01)
  *H04L 5/00*    (2006.01)

(52) U.S. Cl.
  CPC ........ *H04L 25/4902* (2013.01); *H04L 5/0007* (2013.01); *H04L 5/0041* (2013.01); *H04L 27/2666* (2013.01)

(58) Field of Classification Search
  USPC .............................. 375/260, 295, 316, 324
  See application file for complete search history.

(56) References Cited

U.S. PATENT DOCUMENTS

| | | | |
|---|---|---|---|
| 2005/0030886 A1* | 2/2005 | Wu et al. | 370/206 |
| 2008/0025267 A1* | 1/2008 | Wei | H04L 1/0025 370/337 |
| 2008/0090528 A1 | 4/2008 | Malladi | |
| 2008/0187057 A1* | 8/2008 | Qu | 375/260 |
| 2008/0232490 A1* | 9/2008 | Gross et al. | 375/260 |
| 2008/0253279 A1* | 10/2008 | Ma et al. | 370/206 |
| 2009/0238206 A1 | 9/2009 | Hamada et al. | |
| 2010/0136931 A1* | 6/2010 | Kwak et al. | 455/108 |
| 2011/0264982 A1* | 10/2011 | Zhou et al. | 714/755 |
| 2012/0008574 A1* | 1/2012 | Xiao et al. | 370/329 |

FOREIGN PATENT DOCUMENTS

| | | |
|---|---|---|
| WO | 2008/006088 A2 | 1/2008 |
| WO | 2008/089402 A2 | 7/2008 |
| WO | 2008/111787 A2 | 9/2008 |
| WO | 2009/120943 A2 | 10/2009 |

OTHER PUBLICATIONS

International Search Report dated Feb. 21, 2013, issued in PCT Application No. PCT/IB2012/055475, filed Oct. 10, 2012.
SIPO Office Action dated May 31, 2016, issued in Chinese Application No. 201280049941.3, filed Oct. 10, 2012.

* cited by examiner

GENERATION AND PROCESSING OF A VARIABLE-BAND MODULATED OFDM SIGNAL WITH AUXILIARY SIGNALLING

FIELD OF THE INVENTION

The present invention relates to a method and a system for generating a modulated signal, as well as to a method and a system for processing a modulated signal after having received it.

In particular, the present invention is particularly useful (based on the current state of the art in the telecommunications field) when applied to OFDM signals; it is for this reason that the following description will almost exclusively refer to such an application; however, this should not be considered to be a limiting factor.

BACKGROUND ART

The OFDM [Orthogonal Frequency-Division Multiplexing] technique has been known in the telecommunications field for many years; according to this technique, information is transferred from a transmitter to a receiver by modulating a plurality of frequency-adjacent carriers (forming a single frequency band), which are referred to by those skilled in the art as "sub-carriers".

More recently, it has been thought of implementing the OFDM technique through non-adjacent sub-carriers, so as to form at least two sub-bands more or less distant from each other. In this manner, the frequencies between the two sub-bands can be used for other communications; such implementations can be grouped under the name "NC-OFDM technique" [Non-Contiguous OFDM].

In most (theoretical and practical) cases, these techniques are implemented by using a fixed band (in the case of the most traditional implementations of the OFDM technique) or multiple fixed bands (in "non-contiguous" implementations of the OFDM technique).

Unlike the NC-OFDM technique, document WO2008/089402 describes a solution based on the OFDM technique which relates to the IEEE 802.11 standard family and which uses dynamic band allocation; according to this solution, the transmitter generates an OFDM signal having a variable band unknown a priori to the receiver; for the receiver to correctly receive said signal, an additional field that signals carrier usage by the transmitter during the transmission has been added into the PLCP [Physical Layer Convergence Protocol] header of the PPDU [Physical layer Protocol Data Unit] container of the IEEE 802.11 protocol; with 48 sub-carriers available, for each of them it is signalled if it is in use and according to which modulation scheme it is being modulated.

SUMMARY

Such a solution requires a modification to the above-mentioned standard and is not backward-compatible, i.e. the receivers suitable for operating in accordance with the current standard would no longer work, should such a modification be implemented, because they would not be able to decode the PLCP header. Therefore, this solution should be implemented in frequency ranges other than those which are currently implementing such protocol.

The present invention, referred to as "Non Contiguous On Demand-OFDM" (NCOD-OFDM), has the general object of overcoming the limitations of the prior art.

This and other objects are achieved by the methods and systems having the features set out in the appended claims, which are intended to be an integral part of the present description.

The idea at the basis of the present invention is to superimpose on (not to add to) the components of the modulated signal, in particular the OFDM signal, information about the band occupied by the modulated signal, in particular the OFDM signal. In the case of an NC-OFDM signal, such information refers to various sub-bands constituting the band of said signal.

In this manner, the band occupied by the signal can be varied. Such a variation may be an adaptive one, i.e. the transmitter can vary the band, for example, as a function of the operating conditions and/or of users' requests. The receiver can automatically adapt itself to band variations. Typically such variations will be relatively slow, in particular, the band of the OFDM signal will be determined at the beginning of a communication and, if there are no particular requirements or requests, it will have a predefined standard value.

As is known, an OFDM signal can be considered as being composed of a first plurality of components (C) relating to user messages, a second plurality of components (S) relating to signalling, a third plurality of components (P) relating to pilot carriers; said first and second and third pluralities of components (C, S, P) are so associated as to form a fourth plurality of components (X) of the modulating signal.

The information about the band occupied by the OFDM signal is repeatedly or periodically superimposed on at least one of said first and second and third and fourth plurality of components.

If an OFDM signal thus modified is to be received by a standard receiver (i.e. according to the prior art), the superimposed information will be treated like a "disturbance" or "noise", and the receiver will then have to take appropriate measures in order to be able to operate even in the presence of noise. Therefore, if the OFDM according to the present invention is to be received by a standard receiver, one will have to ensure that there is not excessive "disturbance" or "noise" caused by superimposed band information.

When an OFDM signal thus modified is received by a receiver according to the present invention, the receiver can distinguish between superimposed "noise" and superimposed "information", and can therefore extract and use such information to determine the band of the OFDM signal and to complete the demodulation and decoding thereof.

In general, the method for generating a variable-band modulated signal according to the present invention requires the modulating digital signal of said modulated signal to comprise at least one component, and is characterized in that digital information about said variable band is repeatedly or periodically superimposed on said at least one component or on said modulating signal.

Said band may vary either slowly or quickly.

Variability may concern band width and/or position and/or segmentation; it may even be conceivable to use different modulations on different sub-bands.

In particular, if the method is used for generating a variable-band OFDM signal, the modulating signal of said OFDM signal comprises a first plurality of components relating to user messages (in the form of data) to be transmitted, a second plurality of components relating to signalling (in the form of data) to be transmitted, a third plurality of components relating to pilot carriers to be transmitted; said first and second and third pluralities of components are associated in a manner such as to form a fourth plurality of components of the modulating signal; the information about said variable band is repeatedly or periodically superimposed on at least one of said first and second and third and fourth pluralities of components.

Said information about said variable band may correspond to the width of said variable band or of at least one sub-band of said variable band.

Said information about said variable band may correspond to the position of said variable band or of at least one sub-band of said variable band.

Said information about said variable band may correspond to a number of sub-bands constituting said variable band.

Said information about said variable band may be coded to form a plurality of information components; in such a case, said information components will be respectively added to the components of one of said first and second and third and fourth pluralities of components.

The number of said information components may be smaller than or equal to the number of components of one of said first and second and third and fourth pluralities of components.

Said information components are advantageously in a number equal to a power of two.

Said information components advantageously derive from a coding according to which only one or two or three (i.e. a small number) of said components are different from zero at a time.

Advantageously, said information components have maximum widths which depend on the maximum widths of the components of one of said first and second and third and fourth pluralities of components.

Said information components are advantageously generated by means of a PPM technique.

Said information about said variable band may be superimposed on said first plurality of components relating to user messages to be transmitted.

Said information about said variable band may be superimposed on said second plurality of components relating to signalling to be transmitted.

Said information about said variable band may be superimposed on said third plurality of components relating to pilot carriers to be transmitted.

Said information about said variable band may be superimposed on said fourth plurality of components of the modulating signal.

One aspect of the present invention, which is closely related to the above-described method, is a system for generating a modulated signal.

Such a system for generating a variable-band OFDM signal comprises, in general:
  means adapted to associate said first and second and third pluralities of components in a manner such as to form a fourth plurality of components of the modulating signal, and
  an OFDM modulator receiving at its input said fourth plurality of components of the modulating signal and outputting said variable-band OFDM signal;
it may also comprise means adapted to repeatedly or periodically superimpose said information about said variable band on one of said first and second and third and fourth pluralities of components.

One aspect of the present invention, which is dual to the above-described method, is a method for processing a modulated signal after having received it.

In general, such a method requires the modulating digital signal of the modulated signal to comprise at least one component, and comprises the steps of:
  extracting from said modulated digital signal digital information superimposed on one component or on said modulating signal, and
  using said extracted digital information to determine the band of said modulated signal and to complete the demodulation and decoding of said modulated signal.

In particular, if the method is used for processing an OFDM signal (including a first plurality of components relating to user messages, a second plurality of components relating to signalling and a third plurality of components relating to pilot carriers, associated in a manner such as to form a fourth plurality of components), the method comprises the steps of:
  B) extracting from said OFDM signal information superimposed on at least one of said first and second and third and fourth pluralities of components, and
  C) using said extracted information to determine the band of said OFDM signal and to complete the demodulation and decoding of said OFDM signal.

The method may advantageously comprise, prior to said step B, a step of:
  A) determining if said OFDM signal contains information superimposed on at least one of said first and second and third and fourth pluralities of components.

It must be pointed out that steps A and B, though conceptually distinct, might be integrated into a single processing step.

Said step A may be carried out by means of a correlation or an error decoding operation.

Depending on which component is subject to superimposition, the following three cases may arise.

First case: the method may comprise the steps of:
  receiving a predetermined number of components of said OFDM signal relating to pilot carriers and extracting pilot information,
  determining, by means of a correlation operation, if said extracted pilot information contains superimposed information,
  extracting said superimposed information from said extracted pilot information (in particular by means of a correlation operation),
  decoding said extracted information, and
  using said decoded information to determine the band of said OFDM signal and to complete the demodulation and decoding of said OFDM signal.

Second case: the method may comprise the steps of:
  receiving a predetermined number of components of said OFDM signal relating to user messages and extracting user message data,
  determining, by means of an error decoding operation, if said extracted user message data contain superimposed information,
  extracting said superimposed information from said extracted user message data (in particular by means of an error detection and identification operation),
  decoding said extracted information, and
  using said decoded information to determine the band of said OFDM signal and to complete the demodulation and decoding of said OFDM signal.

Third case: the method may comprise the steps of:
  receiving a predetermined number of components of said OFDM signal relating to signalling and extracting signalling data, determining, by means of an error decoding operation, if said extracted signalling data contain superimposed information, extracting said superimposed information from said extracted signalling data (in particular by means of an error detection and identification operation), decoding said extracted information, and using said decoded information to determine the band of said OFDM signal and to complete the demodulation and decoding of said OFDM signal.

One aspect of the present invention, which is closely related to the above-described method, is a system for processing a modulated signal.

Such a system for processing an OFDM signal after having received it comprises, in general:

means adapted to extract from said OFDM signal information (r) superimposed on at least one of said first and second and third and fourth pluralities of components, and means adapted to use said extracted information to determine the band of said OFDM signal and to complete the demodulation and decoding of said OFDM signal.

LIST OF DRAWINGS

Figure 2:
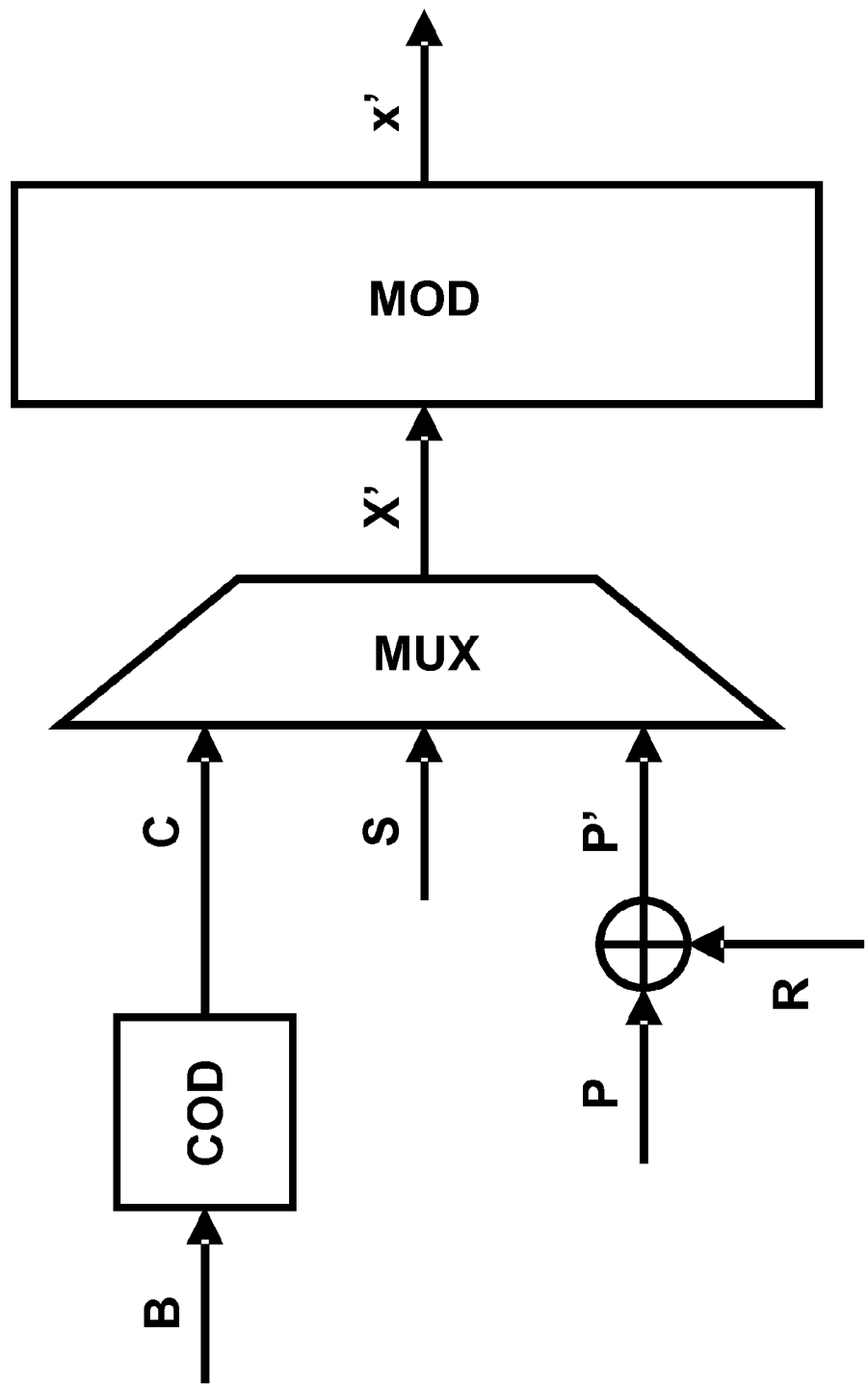
Figure 3:
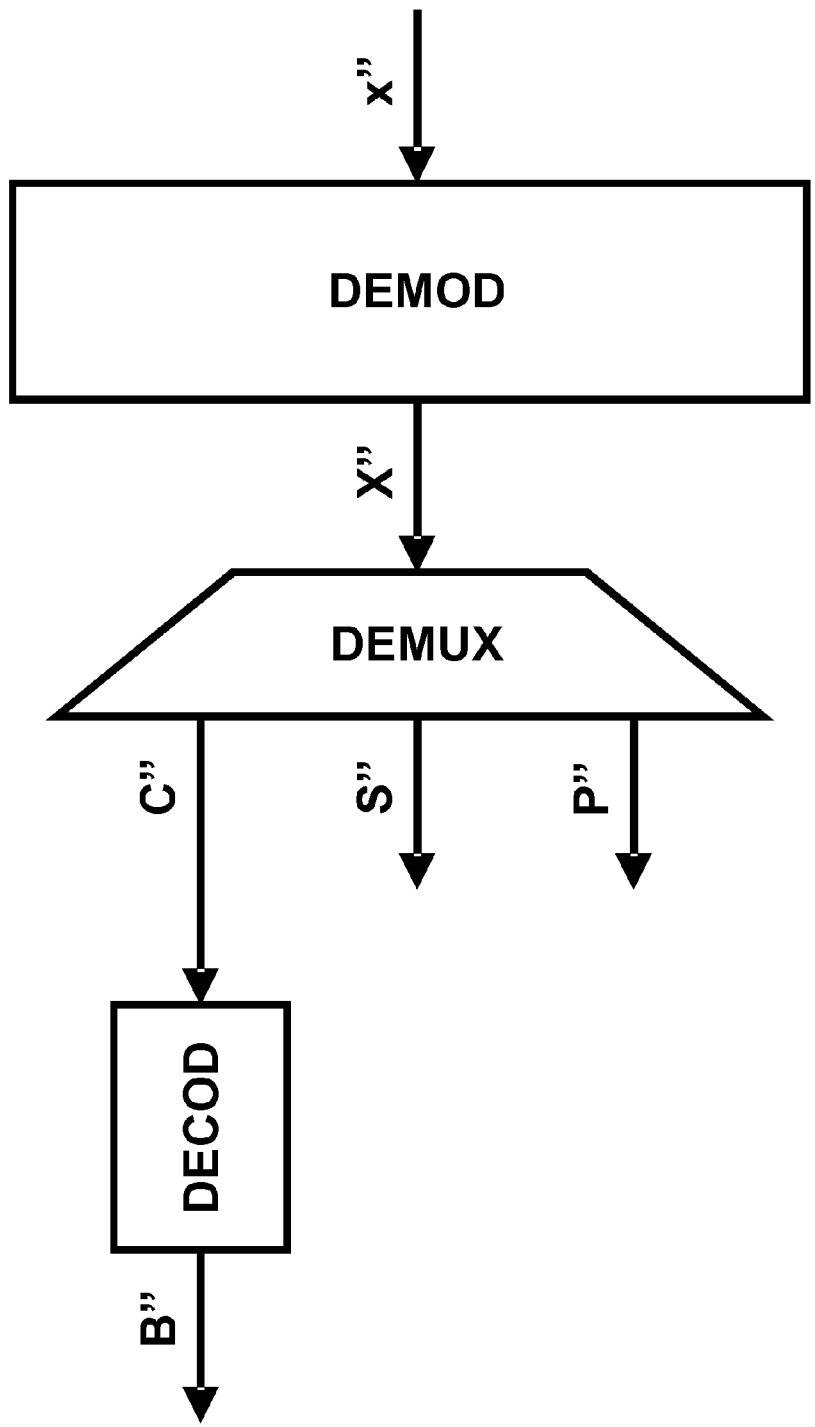
Figure 4:
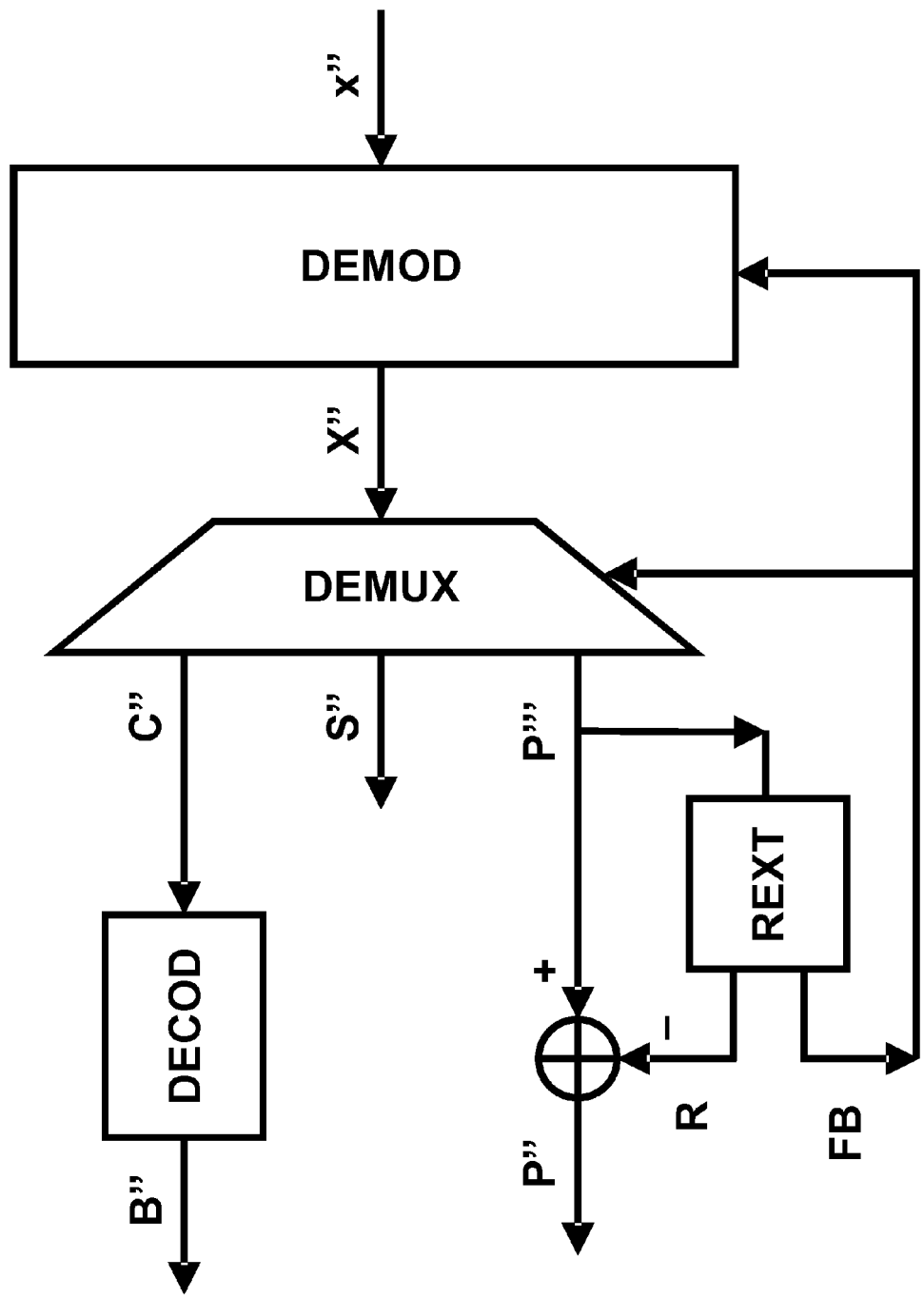

The technical features and the advantages of the present invention will become more apparent from the following description referring to the annexed drawings, wherein:

FIG. 1 shows a block diagram, at the physical layer, of the transmission side of a known OFDM system, FIG. 2 shows a block diagram, at the physical layer, of the transmission side of an OFDM system according to the present invention, FIG. 3 shows a block diagram, at the physical layer, of the reception side of a known OFDM system, and FIG. 4 shows a block diagram, at the physical layer, of the reception side of an OFDM system according to the present invention.

DETAILED DESCRIPTION

Both this description and said drawings are to be considered merely for explanatory, and hence non-limiting, purposes. Furthermore, it should be taken into account that said drawings are schematic and simplified; therefore, the present invention may also be implemented in accordance with other and different embodiments thereof.

For the purposes of the present invention, a known OFDM system can be schematized, at the physical layer and on the transmission side, as shown in FIG. 1. A user message, i.e. "application information" (e.g. an audio signal or a video signal or an audio-video signal) to be transmitted is transformed into a digital format, i.e. into a sequence of digitalized sampled values; said sequence is divided into blocks (thereby forming a sequence of vectors) of constant length K, which blocks are indicated by reference B in FIG. 1; the blocks B are inputted to an encoder COD, which performs a "channel coding" in such a way as to protect these data to be transmitted from any noise or other disturbances which might be introduced along the "channel", i.e. along the path from the transmitter to the receiver; the encoder COD outputs a sequence of blocks (or vectors) C of constant length N. Along with the user message, other information is also transmitted which specifies transmission parameters, e.g. user message coding modes, which information is called "signalling" and is referred to, in the present document, as "primary signalling"; this information is appropriately coded and divided into blocks of constant length (thereby forming a sequence of vectors), which blocks are indicated by reference S in FIG. 1 (it should be noted that FIG. 1 does not show the encoder that generates the blocks S); the "signalling" has a predefined format, so that the receiver can decode it without needing any further information. Finally, together with the user message and the signalling, a binary sequence is also transmitted (which is predetermined and known to both the transmitter and the receiver), which, when suitably chosen, allows the receiver, in particular, to determine (or, better, to estimate) the characteristics of the "channel"; this sequence is called "pilot sequence" and is divided into blocks of constant length (thereby forming a sequence of vectors), which blocks are indicated by reference P in FIG. 1; for transmitting the blocks P special frequencies are used which are called "pilot carriers" (the use of "pilot carriers", whether continuous or discontinuous, is known to those skilled in the art). The data of the blocks C, S, P are associated together to form aggregated blocks (or vectors) X by means of a multiplexer, indicated by reference MUX in FIG. 1. The blocks X are inputted to an OFDM modulator, indicated by reference MOD in FIG. 1. The MOD modulator outputs the OFDM signal, indicated by reference x in FIG. 1, to be irradiated by means of an antenna or a plurality of antennae.

It must be pointed out that the ratio between the parameter K and the parameter N is called "coding rate" and is referred to by means of the symbol RC=K/N. In an OFDM system, several coding rates are generally used, which corresponds to different error correction capacities and to different transmission speeds, and the system may be configured, for example, to choose and use a coding rate based on the instantaneous conditions of the channel on which it is transmitting. The "primary signalling" is also used by the transmitter to communicate to the receiver which coding rate is being used at that moment for coding the user messages and which modulation type is being used at that moment for transmission.

At its input, the modulator MOD generates a sequence of (real or complex) samples "x" for each one of the symbol vectors "X"; typically this generation step is carried out by calculating the inverse discrete Fourier transform [IDFT] or the optimized version thereof, i.e. the inverse fast Fourier transform [IFFT].

$$x=IFFT[X]$$

where $x=(x_1, \ldots, x_Q)$ is a generic sequence of samples at the output of the modulator MOD, where Q is the number of sub-carriers available in the OFDM signal, and where $X=(X_1, \ldots, X_Q)$ is a generic symbol vector inputted to the modulator MOD; each symbol transports a part of the data C, S, P and hence of the (coded) information about user messages, "signalling" and "pilot sequence".

It should be reminded that the data B (not yet coded) flow from the "upper layers" to the physical layer described herein, such data typically coming from the "application layer", i.e. from "user applications".

Channel coding typically requires the use of error detection and correction techniques in order to improve the quality of the connection. Channel coding adds redundancy data to the information stream in order to allow the reception side to detect and correct (or at least to try to correct) any errors present in the received sequence.

The pilot sequence consists of a symbol vector P which is typically constant, predetermined and known to both the transmitter and the receiver. It is entered during transmission in order to allow the receiver to carry out operations for estimating the channel's physical parameters and to facilitate synchronization operations.

In the receiver, the symbols received from the pilot carriers are compared with the respective transmitted symbols (which are known to the receiver because they are predetermined symbols), and the channel coefficients $h_{k,n}$ (which characterize the channel) are estimated by means of the following formula:

$$h_{k,n} = \frac{p_{k,n}^{(r)}}{p_k}$$

where $p_k$ is the generic pilot symbol transmitted and associated with the OFDM pilot carrier "k,n" and $p_{k,n}^{(r)}$ is the corresponding pilot symbol received and associated with the k-th carrier of the n-th OFDM symbol, also referred to as cell (k,n); it must be pointed out that this is only an estimate of channel coefficients, because the difference between $p_{k,n}^{(r)}$ and $p_k$ may be due not only to channel propagation, but also to noise and/or other disturbances.

The calculation of the channel coefficient can be repeated, by using the above formula, for those OFDM signal sub-carriers which transport a pilot symbol; according to the prior art, this calculation is repeated for all those OFDM signal sub-carriers which transport a pilot symbol, i.e. for all pilot sub-carriers.

For the remaining sub-carriers of the OFDM signal, the channel coefficient $h_{k,n}$ is estimated indirectly, typically by using interpolation techniques, on the basis of the estimates directly carried out on pilot sub-carriers; in particular, it is advantageous to calculate these indirect estimates on the basis of direct estimates carried out on close frequencies and/or in recent times; in fact, the channel coefficients relating to a certain frequency band change very slowly over time, and differ only slightly from the channel coefficients relating to adjacent or near frequency bands.

As will become more apparent below, the fact that the pilot sequence of the OFDM signal is predetermined and preferably constant and that the channel coefficients change slowly in time and frequency allows using pilot carriers for transporting an "auxiliary signalling" or "secondary signalling" in accordance with a preferred embodiment of the present invention.

The signalling consists of symbol vectors S, and is entered during transmission for the purpose of communicating to the receiver the parameters used for transmission. This information is transmitted by using a predefined format, so that the receiver can decode it without needing any further information thereof. This information is also preferably coded in a manner such that it can be decoded even in greatly degraded propagation and reception conditions. For example, in the DVB-T standard the signalling information (Transmission Parameter Signalling or TPS) is repeated on a few tens of sub-carriers in order to make it more easily and likely receivable; also, the signalling information is coded by means of channel coding with a BCH code in order to generate the vectors S.

As will become more apparent below, the redundancy with which the "primary signalling" is transmitted allows using this component of the OFDM signal to transport an "auxiliary signalling" or "secondary signalling" in accordance with one embodiment of the present invention.

As aforesaid, the data B relating to user messages are coded, prior to transmission, by means of error detection and correction techniques; in other words, redundancy data are added to the data B in order to generate data C.

As will become more apparent below, the redundancy of the component C allows using this component of the OFDM signal to transport an "auxiliary signalling" or "secondary signalling" in accordance with one embodiment of the present invention.

It can be understood from the above that also the component X, resulting from aggregation of the components C, S, P, contains much redundancy, and this redundancy of the component X allows using this component of the OFDM signal to transport an "auxiliary signalling" or "secondary signalling" in accordance with one embodiment of the present invention.

The present invention takes into account the case wherein the band of the OFDM signal is not predefined but variable (whether slowly or quickly), and is therefore unknown a priori to the receiver; such variability may, for example, concern the band width and/or the number of sub-bands.

In such a case, the "auxiliary signalling" or "secondary signalling" takes care of transferring the information about the band of the OFDM signal from the transmitter to the receiver.

To do so, the present invention proposes to superimpose said "auxiliary signalling" or "secondary signalling" on the OFDM signal (instead of adding it thereto within a specific component); the quantity of information to be transferred and the transfer speed depend on the specific practical implementation of the present invention.

As previously reminded, different components are associated with an OFDM signal: a first plurality of components C relating to user messages, a second plurality of components S relating to signalling ("primary signalling"), a third plurality of components P relating to pilot carriers; there is also a fourth plurality of components X, resulting from the aggregation of the former three.

The present invention can be implemented by superimposing the "auxiliary signalling" or "secondary signalling" on at least one of these components; typically, said superimposition only occurs on one of these; superimposition is done by prearranging a sequence of vectors R that code the "auxiliary signalling" or "secondary signalling" and by making a vectorial sum by adding it to at least one of the sequences of vectors C, S, P, X.

FIG. 2 shows a case wherein superimposition is done on the vectors P of the "pilot sequence"; a vector R is vectorially added to a vector P, obtaining as a result a vector P', i.e. a modified vector P; the vector P' is then used in the system of FIG. 4 exactly as the vector P was used in the system of FIG. 3; consequently, at the output of the multiplexer MUX there will be a vector X', different from the vector X of FIG. 1, and at the output of the modulator MOD there will be a signal x', different from the signal x of FIG. 1.

It must be pointed out that the vector P and the vector R conceptually have the same length. According to particular implementations of the present invention, it may be chosen that a certain number of elements of the vector R (e.g. the last ten) are always null, or that only a certain number of elements of the vector R (e.g. the first ten) are significant; in practice, this means that only some pilot carriers will be used for transmitting the "auxiliary signalling" or "secondary signalling", not all of the theoretically available ones.

If a standard OFDM signal receiver (e.g. one not implementing the present invention) receives the signal x' of FIG. 2, it will extract the vector P' and will use the elements thereof to make estimates of the channel coefficients; one may define an error vector E corresponding to the difference between the vector P, which the standard receiver would receive in the absence of any secondary signalling, and the vector P', which is the one actually received; said error will cause an error in the estimate of the channel coefficients relating to the various sub-carriers used for user messages and "primary signalling".

The components of the vector E (which de facto corresponds to the vector R) should be small on average; one option, as will be described more in detail below, is that only one or very few components of the vector E (and hence of the vector R) are different from zero and small; in such a case, only the channel coefficients of very few sub-carriers will be affected by an estimate error.

The channel coefficient estimate error will cause errors in the estimate of the vector X, and hence also of the vector C; however, if such errors are just a few (i.e. fewer than the correction capacity of the channel code in use), thanks to channel coding the receiver will be able to identify and correct them.

The solution of FIG. 2 can be implemented, for example, by generating the vector R through pulse position modulation (PPM); this modulation only requires one non-null element of the vector R. Furthermore, the elements of the vector R may consist, for example, of just a single bit; in other words, if the vector R is 64 long, i.e. it comprises 64 elements, it can code 64 different symbols, i.e. a 6-bit binary word; if the signalling requires, for example, 1024 information bits, then the full signalling transmission will require the transmission in succession of 1024/64=16 vectors R; in this case, the vector E comprises just one non-null element (i.e. one bit whose logic value is "1"), so that a standard receiver will most likely be able to operate without any problem in spite of the superimposition of the vector R.

It must be pointed out that the vector R must be considered not only on the basis of the non-null elements, but also on the basis of the width of its elements in relation to the width of the elements of the vector on which it is superimposed (the vector P in the above-described case).

As far as the other vectors C, S and X are concerned, superimposition and generation of the vector R may be done in, a manner wholly similar to the one previously described with reference to the vector P.

In all cases, one important aspect is that the receiver can distinguish the vector R from any noise and/or other disturbances. As will be explained more in detail below, the possibility of making such a distinction, and therefore of estimating and extracting the vector R, greatly depends on the redundancy with which the components C, S, P, and hence X, are transmitted; in particular, as regards the component P, said possibility is also related to the fact that the pilot sequence of the OFDM signal is predetermined and preferably constant, and that channel coefficients change slowly in time and frequency; in particular, as regards the components C and S, said possibility is related to the fact that they derive from operations for coding the respective data, which are carried out in such a way as to allow for error detection and correction (within certain limits defined in the project).

In the case of the DVB-T standard, for example, a few tens of sub-carriers are intended for "primary signalling", i.e. the data of the vectors S; therefore, altering a small number of sub-carriers will cause a negligible quality degradation in the received signal; in addition, the "primary signalling" information is coded through FEC [Forward Error Correction] techniques in order to allow correcting any errors. Still with reference to the DVB-T standard case, for example, the user message data, i.e. the data of the vectors B, are coded to form the data of the vectors C by using a concatenated coding scheme consisting of one external code obtained by shortening a Reed-Solomon code with parameters (N, K, m)=(255, 239, 8); said code is concatenated by means of a convolutional interleaver with a binary convolutional code having a rate of ½ and a constraint length of 7; the output of the convolutional encoder is then punctured to obtain different quantities of redundancy, and hence different rates and corresponding correction capacities; the global rate resulting from the coding and subsequent puncturing is in the range of ½ to ⅞; in other words, the data of the vectors C contain much redundancy.

The redundancy of the data of the vectors X depends on the redundancy of the aggregated vectors C, S and P.

The above description is applicable to all OFDM systems, including radio-television broadcasting systems (e.g. DVB-T), wireless LAN systems (e.g., most systems compliant with the IEEE 802.11 standard) and wireless data connection systems having a cellular structure (e.g. LTE and LTE-Advanced).

Although characterized by the same OFDM signal structure (presence of primary signalling and pilot symbols), the above-mentioned systems differ in a few aspects: number of sub-carriers; modulation schemes adopted for sub-carriers; number, position and modulation of pilot symbols; number, position and modulation of sub-carriers intended for primary signalling.

Having different characteristics, the above-mentioned systems are more or less sensitive to alterations of pilot symbols, signalling symbols and data. Therefore, a specific choice of what must be superimposed, and where and how, may also depend on these aspects; for example, in IEEE 802.11 transmission there are only a few pilot carriers, and it is therefore difficult to use them for "auxiliary signalling" superimposition, while in DVB-T transmission there are many pilot carriers, which can be easily used for "auxiliary signalling" superimposition.

All the techniques described herein are totally backward-compatible at the physical layer (i.e. as concerns the pure transmission technique); in fact, since a "superimposition" of an additional signal (i.e. "auxiliary signalling") is done on a standard signal, as opposed to a modification of the structure of the standard signal, a standard receiver will nonetheless be able to receive it; furthermore, since an "appropriate superimposition" is used, a standard receiver will be able to receive the signal properly, although with degraded performance, because it will operate at a reduced signal-to-noise ratio (the signal-to-noise ratio should be understood as a parameter referring to, depending on the specific implementations of the present invention, the application information, the primary signalling, or the pilot carriers).

All the techniques described herein may also be backward-compatible at the application layer, if appropriately used. In fact, for example, the present invention can be used for transmitting a 3D video content disassembled into a 2D video component (2D version of the 3D video content) and an additional video component; for the 2D video component a first frequency sub-band is used, which is transmitted in a traditional manner (except for the fact that the "auxiliary signalling" has been superimposed thereon), so that a standard receiver can receive, decode and present it to the user; for the additional video component, a second sub-band is used; an improved receiver (i.e. a 3D receiver) will be able to receive the signal transmitted in the first sub-band and to retrieve the 2D video component as well as the "auxiliary signalling"; based on the retrieved "auxiliary signalling", the improved receiver will be able to determine the second sub-band (e.g. its lower and upper ends) and also, for example, the characteristics of the coding and modulation scheme employed therein, and then retrieve the additional video component and present the 3D video content to the user.

In other words, in order to ensure backward-compatibility also at the application layer, it is necessary to treat the modulated signal as disassembled into at least two distinct parts and into distinct frequency sub-bands; a first standard part, except for the superimposition of "auxiliary signalling", and a second "non-standard" part, which may include no superimposed "auxiliary signalling"; in some operating conditions, sub-bands may also be adjacent.

Up to this point, the present invention has been described with reference to the transmission side, but the present invention also provides for the reception side.

For the purposes of the present invention, a known OFDM system can be schematized, at the physical layer on the reception side, as shown in FIG. 3; this diagram is dual to the one shown in FIG. 1.

The signal x" of FIG. 3 is equal to the signal x of FIG. 1, except for transformations due to the "channel" in which the signal x has been propagated and for any noise and other disturbances superimposed on the signal x during its propagation.

The vectors B", C", S", P", X" of FIG. 3 are respectively equal to the vectors B, C, S, P, X of FIG. 1, except for modifications caused by propagation in the channel, noise and other disturbances.

The demodulator DEMOD, demultiplexer DEMUX and decoder DECOD blocks of FIG. 3 respectively correspond (with inverse functions) to the modulator MOD, multiplexer MUX and encoder COD blocks of FIG. 1.

The receiver according to the present invention differs from a known OFDM signal receiver essentially for the method used for processing the OFDM signal after having received it; in substance, said method provides for:
  extracting from the OFDM signal information (reference R in FIG. 4) relating to the band of the signal itself, superimposed on at least one of the components C, S, P, X, and then
  using the extracted information (reference R in FIG. 4) to determine the band of the OFDM signal and to complete the demodulation and decoding of the OFDM signal.

Said two operations find correspondence in the diagram of a receiver according to the present invention, more in particular in the section where the signals received by the receiver are processed.

The diagram of FIG. 4 corresponds to the diagram of FIG. 3 and includes some modifications to implement the above specifications in the event that the information about the band of the OFDM signal is superimposed on the vector P, i.e. on the "pilot sequence" transported by the pilot carriers.

As shown in FIG. 4, the vector P'" (which is equal to the vector P' of FIG. 2, except for modifications caused by channel propagation, noise and other disturbances) obtained from the received signal x" is processed by the block REXT in order to extract the vector R corresponding to the band information of the signal x"; the vector R is then subtracted from the vector P'" to obtain the vector P" (which is equal to the vector P of FIG. 2, except for modifications caused by channel propagation, noise and other disturbances); signals FB obtained by decoding the sequence of vectors R are supplied to the demultiplexer DEMUX and/or to the demodulator DEMOD in order to complete the demodulation of the OFDM signal, i.e. to completely demodulate the OFDM signal by taking into account the actual and full band thereof.

It should be noted that, as aforesaid with reference to FIG. 1 and FIG. 2, FIG. 3 and FIG. 4 do not show a decoding block operating on the components S relating to signalling of the OFDM signal.

In the case wherein the "auxiliary signalling" is superimposed on the component P relating to pilot carriers, the following considerations will apply (with reference to FIG. 3 and FIG. 4).

Only a few pilot cells for each OFDM symbol need to be altered by superimposition.

A standard receiver calculates a wrong channel estimate at the altered cell. Said estimation error is equivalent to the presence of a burst of errors in the demodulated signal upstream of the channel decoder DECOD. Said burst of errors can be detected and also corrected by the decoder, if the signal-to-noise ratio is sufficiently high. This can be done if, during the coding and transmission stage, suitable error correction codes (such as, for example, Reed-Solomon codes) and/or suitable interleavers are used.

A receiver according to the present invention knows that the symbols of some pilot cells have been altered by the transmitter.

In order to decode such signals, a possible solution is to calculate the correlation between channel estimates obtained at adjacent pilot cells. Indicating with $h_n = (h_{1,n}, \ldots, h_{P,n})$ the vector of the channel coefficients estimated at the pilot cells transmitted in the n-th OFDM symbol, the vector $r_n = (r_{1,n}, \ldots, r_{P-1,n})$ is calculated by using the following formula:

$$r_{i,n} = \frac{h_{i,n} h^*_{i,n+1}}{|h_{i,n}||h_{i,n+1}|}$$

Due to the correlation among the coefficients $h_{i,n}$, the following hypothesis is assumed:

$$E[r_{i,n}] \approx 1$$

where $E[.]$ indicates the "expected value" operator.

Taking into account, for example, the DVB-T standard, this assumption is supported by the following consideration:
  the coherency band of the radio channel is the following:

$$\Delta f_c = \frac{1}{\tau_{max}} \cong 184430 \text{ Hz}$$

where $\tau_{max} = \max_i[\tau_i]$ is the scattering of propagation delays, equal to approx. $5.42 \times 10^{-6}$ s in the channel model defined in the ETSI standard for DVB-T. In 8 k DVB-T mode (8192 OFDM sub-carriers), said band corresponds to an interval of approx. 165 sub-carriers. Since the frequency distance between two close pilot cells is equivalent to 16 sub-carriers, i.e. an interval which is much smaller than the coherency band, the above hypothesis is verified.

Let us now consider the case of P'=P+R, where $P=(p_1, \ldots, p_{k-1}, p_k, p_{k+1}, \ldots, p_P)$ and $P'=(p'_1, \ldots, p'_{k-1}, -p'_k, p'_{k+1}, \ldots, p'_P)$. In this case, $R=(0, \ldots, 0, -2p_k, 0, \ldots, 0)$.

The vector $r_n$ will be characterized by elements whose phase is approx. 0, except for the elements $r_{k-1,n}$ and $r_{k,n}$, whose phase is approx. $\pi$ radians.

In this manner it is possible to estimate the position of the pulse in the vector R, and thus perform the demodulation of the auxiliary signalling symbol.

Finally, once R has been estimated, it is possible to retrieve the original pilot sequence P=P'−R and thus optimally receive the primary signal.

When the "auxiliary signalling" is superimposed on the component S relating to "primary signalling", the following considerations will apply.

Primary signalling symbols are transmitted by using a coding and modulation scheme which is very robust, i.e. capable of operating at a very low signal-to-noise ratio (typically much lower than the minimum signal-to-noise ratio required for data).

In the DVB-T standard, for example, the same block of signalling symbols is repeated on 17 sub-carriers (2 k mode) or on 68 sub-carriers (8 k mode). Furthermore, each block is coded by using a shortened BCH code (127, 113, t=2), which adds 14 redundancy bits and can correct all error configurations containing two wrong bits per block at most.

Primary signalling blocks are transmitted in a time interval corresponding to one DVB-T frame (corresponding to 68 consecutive OFDM symbols).

Aiming at minimizing the degradation resulting from superimposition, it is possible to distribute the secondary signalling symbols over multiple blocks, so that just one bit per BCH code block will be altered. In this manner, the standard receiver can correct the error corresponding to the alteration even in the simplest case wherein it performs reception on one of the signalling sub-carriers.

By so doing, a 17-bit word (2 k mode) or a 68-bit word (8 k mode) is made available for secondary signalling in each frame.

A standard receiver will only correct any errors detected in the primary signalling.

A receiver according to the present invention will decode the primary signalling block and will correct the errors caused by superimposition, estimating in this manner the primary signalling information. The primary signalling word is then re-coded by using the standard code and compared with the original code word. The difference is the code word of secondary signalling which in turn can be decoded to obtain the secondary signalling information.

When the "auxiliary signalling" is superimposed on the component C relating to user messages, the following considerations will apply.

The system operates in a manner similar to the case of superimposition on primary signalling: the channel decoder can correct any transmission errors (if the quantity thereof is smaller than the correction capacity), whether caused by noise, other disturbances or superimposition-induced alterations.

A standard receiver will only correct any errors detected in the data.

A receiver according to the present invention will perform channel decoding similarly to a standard receiver. The information sequence obtained through standard decoding is then re-coded and subtracted from the received word, so as to obtain the word code corresponding to the coded secondary signalling, which in turn can be decoded to obtain the secondary signalling information.

Up to this point, reference has been made in general to "auxiliary signalling" and "information about the band of the OFDM signal".

Said information may be structured in many different ways; for example, assuming that the OFDM signal can extend to four sub-bands at most, the following fields may be provided:
b1: YES/NO (presence or absence of a first sub-band)
freq_inf_b1: lower limit of b1
freq_sup_b1: upper limit of b1
b2: YES/NO (presence or absence of a second sub-band)
freq_inf_b2: lower limit of b2
freq_sup_b2: upper limit of b2
b3: YES/NO (presence or absence of a third sub-band)
freq_inf_b3: lower limit of b3
freq_sup_b3: upper limit of b3
b4: YES/NO (presence or absence of a fourth sub-band)
freq_inf_b4: lower limit of b4
freq_sup_b4: upper limit of b4
Or else, for example, the following fields may be used:
n_b: number (1 to 4) indicating the number of sub-bands in use
freq_inf_b1: lower limit of the first sub-band
freq_sup_b1: upper limit of the first sub-band
freq_inf_b2: lower limit of the second sub-band
freq_sup_b2: upper limit of the second sub-band
freq_inf_b3: lower limit of the third sub-band
freq_sup_b3: upper limit of the third sub-band
freq_inf_b4: lower limit of the fourth sub-band
freq_sup_b4: upper limit of the fourth sub-band If the present invention is implemented for OFDM systems using just one band having variable width, the auxiliary signalling information may simply be reduced to:
freq_inf_b: lower limit of the band of the OFDM signal
freq_sup_b: upper limit of the band of the OFDM signal As can be understood from the above discussion, the core of the present invention consists of modes of transmission and reception of information about the band of an OFDM signal, and possibly also about the sub-bands thereof.

The modes of determining which frequencies are available for an OFDM signal and/or for deciding which frequencies should actually be assigned to an OFDM transmission are beyond the scope of the present invention; they may take into account, for example, the quality of the channels and/or requests from user applications or users.

The utilization of a frequency band can be verified, for example, by measuring the power of the radio frequency signal in that band: if power is high, then the band is already in use; if, on the contrary, power is lower than a predetermined threshold, then the band is not in use and can therefore be used for a new OFDM transmission.

Frequencies or frequency bands can be assigned to an OFDM signal, for example, by using techniques similar to those already employed in electronic computers to assign memories or memory areas to a process.

The invention claimed is:

1. A method for generating a variable-band OFDM (Orthogonal Frequency Division Multiplexing) signal, the method comprising:
forming a modulating digital OFDM signal by:
associating at least two of a first plurality of components relating to user messages to be transmitted, a second plurality of components relating to signalling to be transmitted, a third plurality of components relating to pilot carriers to be transmitted so as to form a fourth plurality of components
coding information about said variable-band OFDM signal so as to form a plurality of information components; and repeatedly or periodically summing said information components about said variable-band OFDM signal with at least one of said first and second and third and fourth pluralities of components; and modulating said modulating digital OFDM signal to output said variable-band OFDM signal.

2. The method according to claim 1, wherein said information about said variable-band OFDM signal corresponds to a width of said variable-band OFDM signal or of at least one sub-band of said variable-band OFDM signal.

3. The method according to claim 1, wherein said information about said variable-band OFDM signal corresponds to a position of said variable-band OFDM signal or of at least one sub-band of said variable-band OFDM signal.

4. The method according to claim 1, wherein said information about said variable-band OFDM signal corresponds to a number of sub-bands constituting said variable-band OFDM signal.

5. The method according to claim 1, further comprising:
coding said information about said variable-band OFDM signal to form a plurality of information components, and
adding said information components to the components of one of said first and second and third and fourth pluralities of components, respectively.

6. The method according to claim 5, wherein the number of said information components is smaller than or equal to the number of components of said one of said first and second and third and fourth pluralities of components.

7. The method according to claim 5, wherein the number of said information components is equal to a power of two.

8. The method according to claim 5, wherein said information components derive from a coding according to which only one or two or three of said components are different from zero at a time.

9. The method according to claim 5, wherein said information components have maximum widths which depend on the maximum widths of the components of one of said first and second and third and fourth pluralities of components.

10. The method according to claim 8, wherein said information components are generated by way of a PPM technique.

11. The method according to claim 1,
wherein said information about said variable-band OFDM signal is summed with said first plurality of components relating to user messages to be transmitted, or
wherein said information about said variable-band OFDM signal is summed with said second plurality of components relating to signalling to be transmitted, or
wherein said information about said variable-band OFDM signal is summed with said third plurality of components relating to pilot carriers to be transmitted, or
wherein said information about said variable-band OFDM signal is summed with said fourth plurality of components of the modulating signal.

12. The method according to claim 1, wherein the at least one component or said modulating digital signal comprises vectors and wherein repeatedly or periodically summing digital information about said variable-band OFDM signal with said at least a one component or with said modulating digital signal includes performing a vector sum.

13. A system for generating a variable-band OFDM (Orthogonal Frequency-Division Multiplexing) signal, wherein a modulating signal of said variable-band OFDM signal comprises a first plurality of components relating to user messages to be transmitted, a second plurality of components relating to signalling to be transmitted, a third plurality of components relating to pilot carriers to be transmitted, having an input for receiving information about said variable-band OFDM signal, said system comprising:
a multiplexer for associating at least two of said first plurality of components and said second plurality of components and said third plurality of components to form a fourth plurality of components of said modulating signal,
an encoder configured to code information about said variable-band OFDM signal to form a plurality of information components; and
an OFDM modulator including an input, wherein said OFDM modulator receives said fourth plurality of components of said modulating signal and outputs said variable-band OFDM signal;
wherein said plurality of information of information components are repeatedly or periodically summed with at least one of said first plurality of components, said second plurality of components, said third plurality of components, and said fourth plurality of components before said fourth plurality of components is modulated by said OFDM modulator and output as said variable-band OFDM signal.

14. A method for processing a variable-band OFDM (Orthogonal Frequency Division Multiplexing) signal after having received the variable-band OFDM signal, wherein a modulating digital signal of said variable-band OFDM signal comprises a first plurality of components relating to user messages, a second plurality of components relating to signalling, a third plurality of components relating to pilot carriers, wherein at least two of said first plurality of components, said second plurality of components and said third plurality of components are associated to form a fourth plurality of components of said modulating digital signal, said method comprising the steps of:
demodulating said variable-band OFDM signal to obtain said modulating digital signal;
extracting, from said demodulated variable-band OFDM signal, information components about said variable-band OFDM signal summed with at least one of said first plurality of components, said second plurality of components, said third plurality of components, and said fourth plurality of components, wherein information about said variable-band OFDM signal was coded by an encoder to form said information components,
deriving said information about said variable-band OFDM signal by decoding said information components, and
using said derived information to determine a band of said variable-band OFDM signal and to complete the demodulation and decoding of said variable-band OFDM signal.

15. The method according to claim 14, comprising, prior to said step of deriving said information, a step of:
determining if said variable-band OFDM signal contains information summed with at least one of said first plurality of components, said second plurality of components, said third plurality of components, and said fourth plurality of components.

16. The method according to claim 15, further comprising determining if said variable-band OFDM signal contains information by way of an error correlation or a decoding operation.

17. The method according to claim 14, further comprising:

receiving a predetermined number of components of said variable-band OFDM signal relating to pilot carriers and extracting pilot information, determining, by way of a correlation operation, if said extracted pilot information contains summed information, extracting said summed information from said extracted pilot information, decoding said extracted information, and using said decoded information to determine a band of said variable-band OFDM signal and to complete the demodulation and decoding of said variable-band OFDM signal.

18. The method according to claim 14, further comprising:

receiving a predetermined number of components of said variable-band OFDM signal relating to user messages and extracting user message data, determining, by way of an error decoding operation, if said extracted user message data contain summed information, extracting said summed information from said extracted user message data, decoding said extracted information, and using said decoded information to determine a band of said variable-band OFDM signal and to complete the demodulation and decoding of said variable-band OFDM signal.

19. The method according to claim 14, further comprising the steps of:

receiving a predetermined number of components of said variable-band OFDM signal relating to signalling and extracting signalling data, determining, by way of an error decoding operation, if said extracted signalling data contain summed information, extracting said summed information from said extracted signalling data, decoding said extracted information, and using said decoded information to determine a band of said variable-band OFDM signal and to complete the demodulation and decoding of said variable-band OFDM signal.

20. The method according to claim 14, wherein deriving, from said modulated signal, said digital information summed with one of the at least one component or with said modulating signal includes subtracting the digital information from the at least one component or from said modulating signal.

21. The method according to claim 14, wherein deriving, from said modulated signal, said digital information summed with one of the at least one component or with said modulating signal includes performing an algebraic subtraction or sum operation to obtain the digital information from the at least one component or from said modulating signal.

22. A system for processing a variable-band OFDM (Orthogonal Frequency-Division Multiplexing) signal after having received the variable-band OFDM signal, wherein a modulating digital signal of said OFDM signal comprises a first plurality of components relating to user messages, a second plurality of components relating to signalling, a third plurality of components relating to pilot carriers, wherein at least two of said first plurality of components, said second plurality of components, and said third plurality components are associated to form a fourth plurality of components of said modulating signal, said system comprising:

a demodulator for demodulating said variable-band OFDM signal;

means for extracting, from said demodulated variable-band OFDM signal, information components summed with at least one of said first and second and third and fourth pluralities of components, wherein digital information about said variable-band OFDM signal was coded by an encoder to form said information components, and means for deriving said digital information about said variable-band OFDM signal by decoding said information components, means for using said derived information to determine a band of said variable-band OFDM signal and to complete demodulation and decoding of said variable-band OFDM signal.

* * * * *